United States Patent
Chang (10) Patent No.: US 9,575,573 B2
(45) Date of Patent: Feb. 21, 2017

(54) STYLUS WITH TOUCH SENSOR

(71) Applicant: Apple Inc., Cupertino, CA (US)

(72) Inventor: Ray L. Chang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/575,740

(22) Filed: Dec. 18, 2014

(65) Prior Publication Data

US 2016/0179222 A1 Jun. 23, 2016

(51) Int. Cl.
*G06F 3/0354* (2013.01)
*G06F 3/038* (2013.01)
*G06F 1/16* (2006.01)

(52) U.S. Cl.
CPC ......... *G06F 3/03545* (2013.01); *G06F 3/0383* (2013.01); *G06F 1/1694* (2013.01); *G06F 2203/0384* (2013.01)

(58) Field of Classification Search
None
See application file for complete search history.

(56) References Cited

U.S. PATENT DOCUMENTS

| | | | |
|---|---|---|---|
| 5,774,571 A | 6/1998 | Marshall | |
| 5,959,616 A | 9/1999 | Challener | |
| 6,307,956 B1 | 10/2001 | Black | |
| 6,473,072 B1 | 10/2002 | Comiskey | |
| 6,621,697 B2 | 9/2003 | O'Hara et al. | |
| 7,184,033 B2 | 2/2007 | Burrus, IV et al. | |
| 7,348,968 B2 | 3/2008 | Dawson | |
| 7,467,948 B2 | 12/2008 | Lindberg et al. | |
| 8,059,105 B2 | 11/2011 | Rosenberg | |
| 8,482,545 B2 | 7/2013 | King-Smith et al. | |
| 8,502,651 B2 | 8/2013 | Birnbaum | |
| 8,723,820 B1 | 5/2014 | Han | |
| 8,773,405 B1 | 7/2014 | Ryshtun et al. | |
| 8,878,823 B1 | 11/2014 | Kremin et al. | |
| 8,922,527 B2 | 12/2014 | Ryshtun et al. | |
| 8,956,230 B2 | 2/2015 | Adhikari | |
| 8,988,445 B2 | 3/2015 | Kuchenbecker | |
| 2001/0006383 A1* | 7/2001 | Fleck .................. | G06F 3/03545 345/179 |
| 2002/0021291 A1 | 2/2002 | Cook | |
| 2005/0083314 A1 | 4/2005 | Shalit | |
| 2005/0116940 A1 | 6/2005 | Dawson et al. | |
| 2005/0248549 A1 | 11/2005 | Dietz et al. | |

(Continued)

*Primary Examiner* — David D Davis
(74) *Attorney, Agent, or Firm* — Treyz Law Group, P.C.; G. Victor Treyz; Joseph F. Guihan (57) ABSTRACT

A stylus may have an elongated body with opposing ends. Electronic equipment may have a touch sensor that receives electromagnetic signals from one or more electrodes. The stylus may have a touch sensor on the elongated body. The touch sensor on the body may have electrodes that gather touch input and optional force input when the fingers of a user touch the stylus. The touch input may include touch gestures in which a user's fingers move along the length of the stylus and may include rotational information indicative of how the stylus is being rotated between the user's fingers. The stylus may have a force sensor that monitors how firmly the stylus is being pressed against external surface and may have other input-output devices. The stylus may transition between operating modes based on signals from the force sensor and other input-output devices in the stylus.

9 Claims, 11 Drawing Sheets

(56) References Cited

U.S. PATENT DOCUMENTS

| | | |
|---|---|---|
| 2005/0253816 A1 | 11/2005 | Himberg et al. |
| 2007/0139399 A1 | 6/2007 | Cook |
| 2008/0030486 A1 | 2/2008 | Cook |
| 2008/0186255 A1 | 8/2008 | Cohen |
| 2009/0167702 A1 | 7/2009 | Nurmi et al. |
| 2009/0251338 A1 | 10/2009 | Marggraff et al. |
| 2009/0264713 A1* | 10/2009 | Van Loenen ......... B43K 5/025 600/301 |
| 2009/0303204 A1 | 12/2009 | Nasiri |
| 2010/0006350 A1 | 1/2010 | Elias |
| 2010/0170726 A1 | 7/2010 | Yeh et al. |
| 2010/0188400 A1 | 7/2010 | Chen et al. |
| 2011/0006982 A1 | 1/2011 | Rhee |
| 2011/0115751 A1 | 5/2011 | Wernersson |
| 2011/0155044 A1 | 6/2011 | Burch et al. |
| 2012/0013530 A1 | 1/2012 | Tsuboi |
| 2012/0062521 A1 | 3/2012 | Ahn et al. |
| 2012/0068964 A1* | 3/2012 | Wright ............... G06F 3/03545 345/174 |
| 2012/0105361 A1 | 5/2012 | Kremin et al. |
| 2012/0113065 A1 | 5/2012 | Chin |
| 2012/0127110 A1 | 5/2012 | Amm et al. |
| 2012/0146958 A1 | 6/2012 | Oda et al. |
| 2012/0249461 A1 | 10/2012 | Flanagan et al. |
| 2012/0331546 A1* | 12/2012 | Falkenburg ......... G06F 3/03545 726/16 |
| 2013/0002606 A1 | 1/2013 | Mann |
| 2013/0021288 A1 | 1/2013 | Karkkainen et al. |
| 2013/0100070 A1 | 4/2013 | Zheng et al. |
| 2013/0147748 A1 | 6/2013 | Westerinen |
| 2013/0181953 A1 | 7/2013 | Hinckley et al. |
| 2013/0201162 A1 | 8/2013 | Cavilia et al. |
| 2013/0207925 A1 | 8/2013 | Ryshtun et al. |
| 2013/0249823 A1 | 9/2013 | Ahn et al. |
| 2013/0257777 A1 | 10/2013 | Benko |
| 2013/0286033 A1 | 10/2013 | Mesaros et al. |
| 2013/0286174 A1 | 10/2013 | Urakabe |
| 2014/0002422 A1 | 1/2014 | Stern et al. |
| 2014/0028635 A1 | 1/2014 | Krah |
| 2014/0055424 A1 | 2/2014 | Mercea et al. |
| 2014/0062962 A1 | 3/2014 | Jang et al. |
| 2014/0092055 A1 | 4/2014 | Radivojevic |
| 2014/0118127 A1 | 5/2014 | Levesque et al. |
| 2014/0160087 A1* | 6/2014 | Mercea ............... G06F 3/0383 345/179 |
| 2014/0229858 A1 | 8/2014 | Bleker et al. |
| 2014/0253522 A1* | 9/2014 | Cueto ................. G06F 3/03545 345/179 |
| 2014/0267184 A1 | 9/2014 | Bathiche et al. |
| 2015/0002481 A1* | 1/2015 | Mercea ............... G06F 3/03545 345/179 |
| 2015/0138128 A1 | 5/2015 | Herrick et al. |
| 2015/0169056 A1 | 6/2015 | Weddle et al. |
| 2015/0212578 A1 | 7/2015 | Lor et al. |
| 2015/0212602 A1 | 7/2015 | Lor et al. |

* cited by examiner

STYLUS WITH TOUCH SENSOR

BACKGROUND

This relates generally to styluses, and, more particularly, to styluses that provide input to external equipment such as equipment with touch screen displays and other touch sensitive devices.

Touch sensors are used in equipment such as tablet computers, cellular telephones, and drawing tablets. In many situations, a user may provide touch input by pressing a finger against the surface of a touch sensor. By moving the finger across the sensor, the user may manipulate displayed objects and may provide other input.

Touch input may also be provided using computer styluses. A stylus may have an elongated shape with a pointed tip to facilitate drawing and other activities. An electronic device can use a touch sensor to monitor the position of the tip of the stylus. The device can then draw a line on a display or take other suitable action in response to movement of the stylus tip across the sensor.

It can be challenging for a user to interact with electronic equipment using a computer stylus. In some situations, a display is not sufficiently large to contain all of a user's work, so scrolling to different portions of a screen becomes necessary. Scrolling using stylus scrolling wheels or scrolling wheels in other devices such as computer mice can be cumbersome. It can also be difficult use a stylus to perform complex operations such as object rotations, zooming operations, and other operations without requiring a large number of interactions between the stylus and the touch sensor.

It would therefore be desirable to be able to provide an improved stylus for providing input to electronic equipment.

SUMMARY

A stylus may have an elongated body with opposing first and second ends. The first end may form a tip that is used in drawing lines and providing other input to a touch sensor in a touch screen display or other electronic equipment. The touch sensor in the electronic equipment may receive electromagnetic signals from one or more electrodes at the first end.

The stylus may have a touch sensor on the elongated body. The touch sensor may be a capacitive touch sensor having capacitive touch sensor electrodes. The capacitive touch sensor electrodes may gather touch input when the fingers of a user touch the stylus. The touch input may be wirelessly transmitted to the electronic equipment. The touch input may include touch gestures and other touch input in which a user's fingers move along the length of the stylus and may include rotational information indicative of how the stylus is being rotated between the user's fingers.

The stylus may have a force sensor that monitors how firmly the stylus is being pressed against an external surface and may have other input-output devices. The stylus may transition between operating modes based on signals from the force sensor and the other input-output devices.

DETAILED DESCRIPTION

A stylus may be used to provide input to a touch sensor. The touch sensor may be, for example, a capacitive touch sensor having an array of capacitive touch sensor electrodes. The stylus may be a passive stylus having a tip whose position is detected by the touch sensor using the capacitive touch sensor electrodes or may be an active stylus having one or more electrodes that emit electromagnetic signals that are detected using the capacitive touch sensor electrodes.

The stylus may have an elongated body. The tip may be located at one end of the body. A passive or active eraser may be located at an opposing end of the body. The stylus may have input-output devices such as buttons, may have force sensors to detect tip and eraser press events, may have an accelerometer to detect motion of the stylus, and may have other input-output devices.

A touch sensor may be located on the elongated body. The touch sensor may be a capacitive touch sensor or a touch sensor based on other touch technologies. The touch sensor may have an array of capacitive touch sensor electrodes that extend along the length of the body. The electrodes may be patterned to obtain information on the location or locations at which a user is touching the stylus along the length of the body. If desired, the electrodes may also be patterned to obtain information on the location or locations around the circumference of the body at which a user is touching the stylus. In some arrangements, both longitudinal location information and circumferential location information can be gathered.

Touch data from the touch sensor on the body of the stylus may be used to gather touch gesture commands from a user (e.g., flicks of the user's finger along the length of the stylus), may be used to gather information on how the stylus is being rotated between the fingers of the user, and may be used to gather other touch input from the user.

Figure 1:
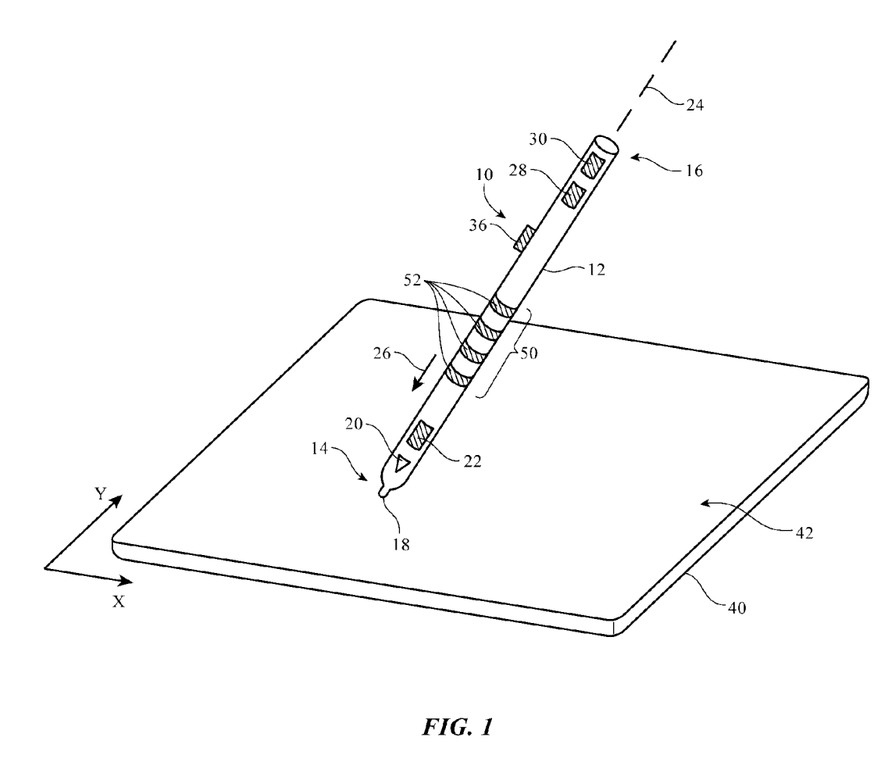
FIG. 1 is a perspective view of an illustrative stylus and electronic equipment with a touch sensor in accordance with an embodiment.

Touch input that is gathered from the touch sensor in the stylus may be wirelessly transmitted to external electronic equipment. The electronic equipment may receive the wireless touch sensor input from the stylus and may use the received input to control operation of a drawing application or other software running on the equipment In the illustrative configuration of FIG. 1, stylus 10 is being used to provide input to external equipment 40. As shown in FIG. 1, equipment 40 may have a front surface such as surface 42. Surface 42 may include a touch sensor (e.g., an array of capacitive touch screen electrodes or other touch sensor). If desired, surface 42 may also include a display. In some configurations, equipment such as equipment 40 of FIG. 1 may be an electronic device that does not contain a display (i.e., a device such as a drawing tablet with a touch sensor but no visual output capabilities). In this type of configuration, the touch sensor device may gather touch input, whereas corresponding visual output for the user may be provided using additional electronic equipment such as a separate device with a display.

Stylus 10 may have an elongated shape. For example, stylus 10 may have a cylindrical body such as body 12 or may have a body with other suitable shapes (e.g., body 12 may have one or more planar sides, may have an oval cross-sectional shape, etc.). Body 12 may extend along longitudinal axis 24 between opposing ends 14 and 16. End 14 can be used for supplying touch input to device 40 in connection with performing drawing tasks in a drawing application or performing other touch sensor input tasks. End 14 may sometime be referred to as the drawing end of stylus 10. End 16 of stylus 10 may be used for providing eraser input to a drawing application or other touch sensor tasks and may sometimes be referred to as the eraser end of stylus 10.

Stylus tip 18 may be formed at end 14 of stylus 10. Stylus tip 18 may be used to provide touch sensor input to the touch sensor on surface 42 of electronic equipment 40. For example, stylus tip 18 may be an active tip that provides electromagnetic signals to the touch sensor of equipment 40 using one or more electrodes such as electrodes 20. The electromagnetic signals supplied by electrodes 20 may be modulated using an amplitude modulation scheme or other suitable modulation scheme. The touch sensor of device 40 may receive the modulated electromagnetic signal using an array of capacitive electrodes and may process the received signals to identify the position of tip 18 on surface 42 in lateral dimensions X and Y. End 16 of stylus 10 may also have an active touch sensor electrode or may have a passive component such as a conductive element that is used in providing eraser touch input when end 16 is adjacent to the touch sensor on surface 42.

Stylus 10 may have force sensors such as force sensors 22 and 30. Sensors 22 and 30 may be used to detect stylus press events. To provide this type of force-based input, a user may press end 14 or end 16 of stylus 10 against surface 42. For example, when tip 18 of stylus 10 is resting against surface 42, the user may move stylus 10 in direction 26 along longitudinal axis 24. This presses tip 18 against surface 42 and creates a detectable force input to force sensor 22. Sensor 30 may be activated in the same way by pressing end 16 against surface 42.

Force sensor input may be provided in the form of single press events (e.g., single clicks), may be provided in the form of multiple presses (e.g., double clicks, triple clicks, quadruple clicks, etc.), may be used to provide continuous analog input (e.g., a force signal that varies continuously as a function of applied user force to control audio volume, line width in a drawing application, or other adjustable parameters for device 40), or may be combined with other user input to generate commands or other input for stylus 10.

Stylus 10 may include buttons such as button 36. A user may press button 36 to supply stylus 10 with button press input. If desired, buttons such as button 36 may be omitted from stylus 10 to avoid cluttering the exterior surface of stylus 10. The use of button 36 in the configuration for stylus 10 that is shown in FIG. 1 is merely illustrative.

Stylus 10 may have one or more motion sensors such as accelerometer 28. Motion sensors may be located at end 14, at end 16, or elsewhere in the body of stylus 10. In the example of FIG. 1, accelerometer 28 is located at end 16 of stylus 10.

Touch sensor 50 may be provided on the surface of body 12 and may be used to detect the position of one or more fingers of the user. Touch sensor 50 may have capacitive sensor electrodes 52. Electrodes 52 may be patterned in an array along the length of body 12 and/or may be in a circumferential array so that touch sensor 50 provides longitudinal touch position information (touch data such as longitudinal finger position information indicating where sensor 50 is being touched by one or more fingers of a user along longitudinal axis 24) and/or circumferential touch position information (touch data such as circumferential finger position information indicating where sensor 50 is being touched around the circumference of stylus 10 by one or more fingers of a user). Single-touch events and multi-touch events can be detected using touch sensor 50. Touch input may be used to manipulate on-screen objects, to change settings within equipment 40, to supply input to application programs (e.g., drawing applications, games, business presentation programs, etc.), to supply input to an operating system, or to provide input to other software running on equipment 40.

In addition to providing near-field electromagnetic signals from electrodes 20, stylus 10 may be used to provide external equipment such as equipment 40 with wireless signals 32. Wireless signals 32 may include Bluetooth® signals, wireless local area signals such as IEEE 802.11 signals, or other radio-frequency wireless signals. Wireless signals 32 may be used to convey touch sensor information from touch sensor 50, motion information from accelerometer 28, force information from sensors 22 and/or 30, information from other sensors, button press information from button 36, and information from other input-output devices in stylus 10 to external equipment such as equipment 40. This data may be processed internally by control circuitry in stylus 10 and may be used in adjusting the operation of stylus 10 in addition to controlling external equipment 40.

In general, any software running on stylus 10 and/or external equipment 40 may be controlled using input from stylus 10 (e.g., input gathered by placing tip 18 on a touch sensor in equipment 40, input gathered from input-output devices in stylus 10, etc.) Consider, as an example, a situation in which electronic equipment 40 contains a display such as display 54 of FIG. 2. Electronic equipment 40 may contain a touch sensor. The touch sensor may be a part of display 54 (i.e., display 54 may be a touch screen display) or the touch sensor may be a stand-alone device.

Figure 2:
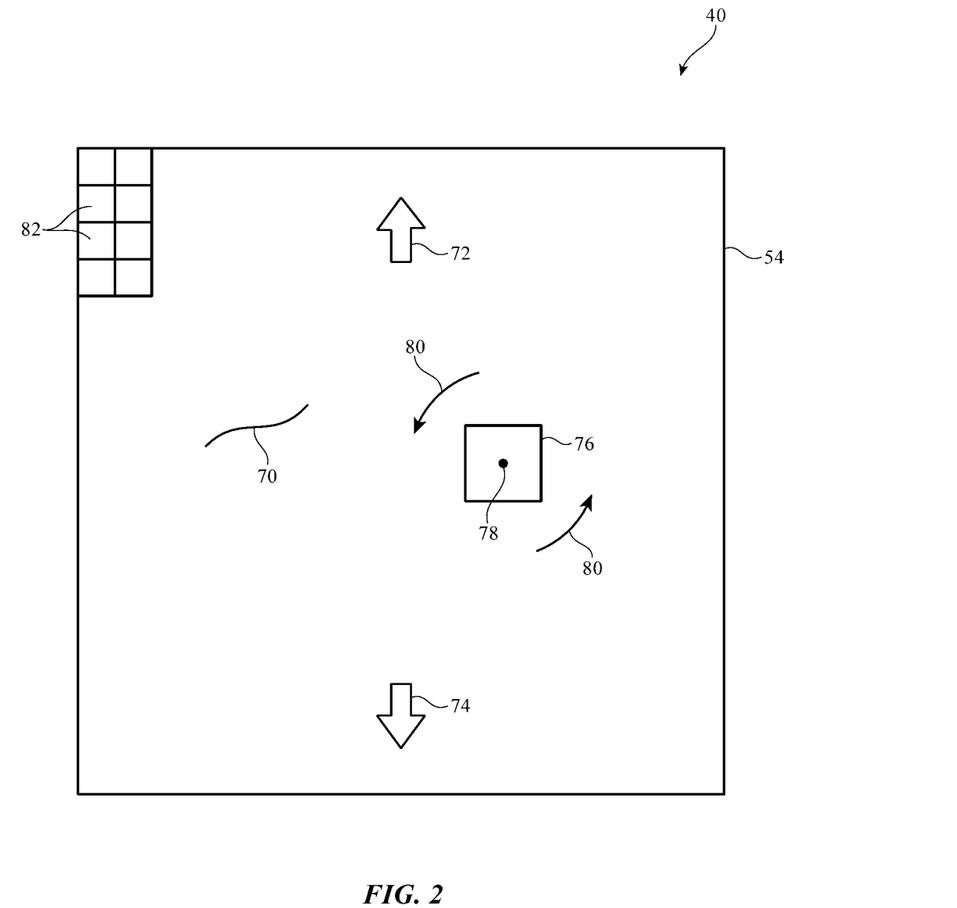
FIG. 2 is a diagram of an illustrative display screen that may be scrolled and used to draw and manipulate on-screen objects using a stylus in accordance with an embodiment.

Equipment 40 may gather input from electrodes 20 in tip 18 of stylus 10 using the touch sensor. As shown in FIG. 2, this allows tip 18 to be used to draw lines on display 54 such as line 70. Tip 18 may also be used to interact with selectable on-screen options. For example, display 54 may contain on-screen options 82 (e.g., options to select paint brushes or other drawing tools in a drawing application, options to zoom in and out, etc.). A user may select a desired paint brush or may make other menu selections by using tip 18 to select an appropriate one of options 82 (as an example).

Objects such as object 76 may be drawn by tip 18, may be selected from an on-screen menu, or may be produced by other interactions with the drawing application running on equipment 40. If desired, object 76 may be rotated about rotational axis 78 or other rotational axis. For example, object 76 may be rotated in directions 80 about axis 78. With one suitable arrangement, tip 18 may be dragged along the surface of the touch sensor to rotate a portion of object 76 about axis 78.

With another suitable arrangement, touch sensor input from stylus touch sensor 50 may be used to rotate object 76. For example, touch sensor 50 may be used to gather information on the rotational position of stylus 10 about axis 24 while stylus 10 is being held between an opposing pair of fingers by a user. The rotation of stylus 10 may then be used as an input to control the rotation of object 76 by a corresponding amount. Stylus rotation can also be used as an input to control zooming, brush width, line width or other parameters in a drawing application or other program running on equipment 40.

Stylus touch sensor input from touch sensor 50 may also be used to control scrolling operations for display 54 and other functions for equipment 40. For example, a user may move a finger up or down the length of body 12. As the finger passes over touch sensor 50, the screen that is displayed for the user on display 54 may be scrolled up in direction 72 or down in direction 74 by an amount corresponding to the amount by which the finger was moved. Longitudinal finger movements on stylus 10 (i.e., finger movements along the length of touch sensor 50 parallel to axis 24) may be used to control any suitable operation in a drawing application or other program running on equipment 40. The use of longitudinal finger movements to control scrolling is merely illustrative.

If desired, touch sensor 50 may receive touch gestures from a user. For example, gestures such as flicks of the finger up or down the length of sensor 50 may be used to impart scrolling motion to the screen being displayed on equipment 40. The scrolling motion imparted by a flick gesture may be different than the scrolling motion that is produced when moving the user's finger slowly and continuously along the length of sensor 50. For example, a flick gesture may cause the screen to scroll at a rate that is initially fast until slowing to a stop without further input from the user. When a user slowly adjusts the longitudinal position of the user's finger on sensor 50, however, the screen may scroll up or down as appropriate and may come to a stop as soon as the finger is removed from the sensor.

Sensor 50 (or other portions of stylus 10) may incorporate a force sensor. Touch input and/or force input may be used to control operations such as zoom operations. For example, applied force may be measured and used to control how much a displayed image or part of an image is zoomed during drawing. When stylus 10 detects that a user has pinched or gripped stylus 10 tightly (e.g., when applied squeezing force to sensor 50 is detected by a force sensor structure in sensor 50), the amount of drawing precision that is provided to the user may be adjusted. A user may also zoom in or out by exerting more or less force on the force sensor structures of sensor 50. Force sensor input and/or touch input may, if desired, be used to implement an invisible button for turning on/off a hover mode or for enabling functionalities such as a spray air pen function.

Force sensor and/or touch input may also be used to perform click and pinch operations (e.g., clicking and pinching operations can be used to "pick up" an object and when combined with the inertial sensor data (e.g., from a sensor such as sensor 28), this input may be used for manipulating objects off screen.

Other operating parameters may be adjusted using gestures and/or other touch sensor inputs if desired (e.g., audio volume, screen brightness, hue/contrast settings, or any other setting in a program operating on equipment 40). The use of touch sensor gestures to adjust screen position (scrolling, etc.) is merely illustrative.

Figure 3:
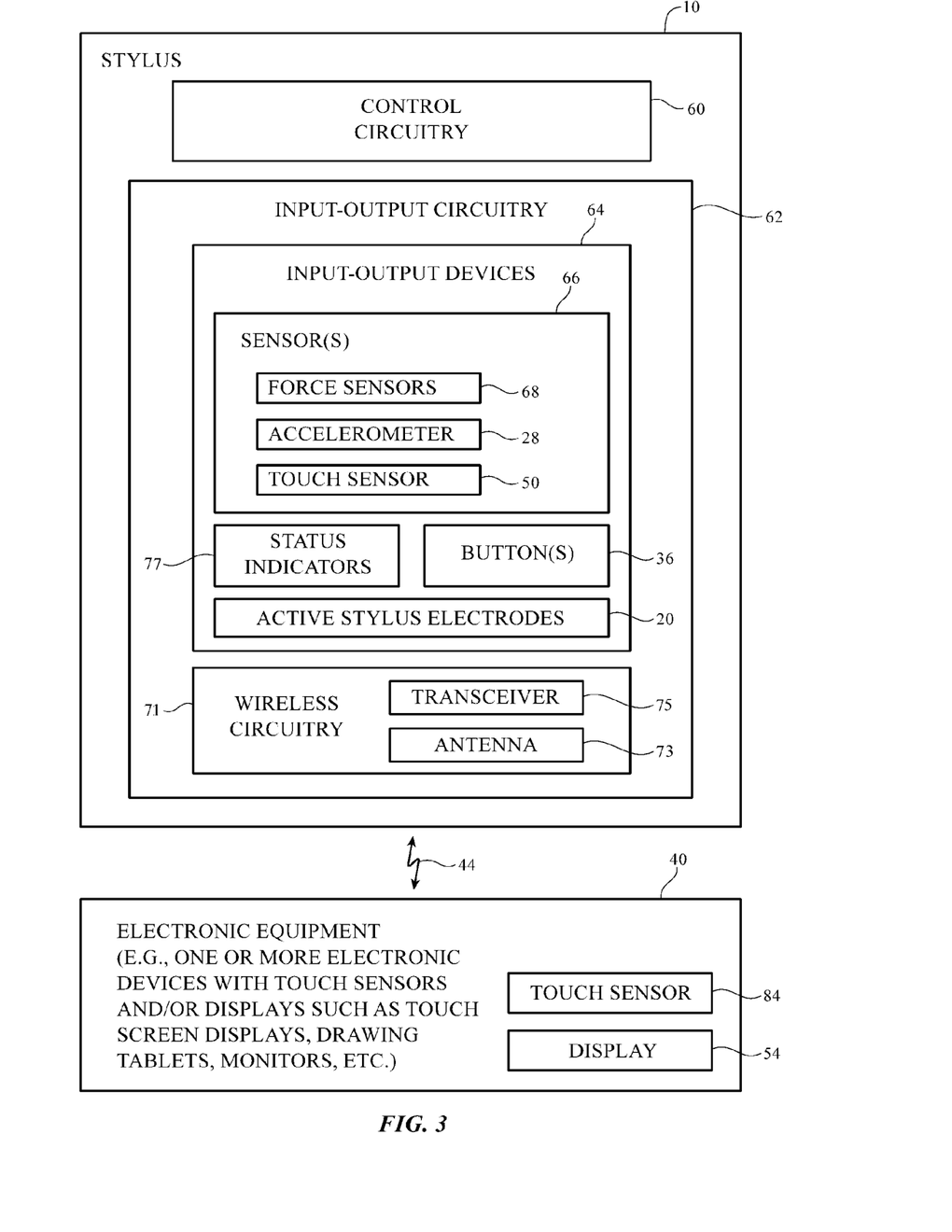
FIG. 3 is a schematic diagram of an illustrative stylus and external equipment in accordance with an embodiment.

A schematic diagram of an illustrative stylus with a touch sensor is shown in FIG. 3. As shown in FIG. 3, stylus 10 may have control circuitry 60. Control circuitry 60 may include storage and processing circuitry for supporting the operation of stylus 10. The storage and processing circuitry may include nonvolatile memory (e.g., flash memory or other electrically-programmable-read-only memory configured to form a solid state drive), volatile memory (e.g., static or dynamic random-access-memory), etc. Processing circuitry in control circuitry 60 may be used to control the operation of stylus 10. The processing circuitry may be based on one or more microprocessors, microcontrollers, digital signal processors, baseband processors, power management units, audio chips, application specific integrated circuits, etc.

Input-output circuitry 62 in stylus 10 may include input-output devices 64 and wireless circuitry 71.

Input-output devices 64 may be used to allow data to be supplied to stylus 10 and to allow data to be provided from stylus 10 to external devices. Input-output devices 64 may include buttons such as buttons 36. Buttons 36 may include mechanical buttons and non-mechanical buttons and may be used in gathering button press information from a user. Input-output devices 64 may also include status indicators 77 such as light-emitting diodes and other devices that provide status output to a user. Active stylus electrodes 20 may be used to provide near-field electromagnetic signals to a capacitive touch sensor in external equipment.

Input-output devices 64 may include sensors 66. Sensors 66 may include force sensors 68. Force sensors 68 may include a force sensor at end 14 of stylus 10 such as force sensor 22 and/or a force sensor at end 16 of stylus 10 such as force sensor 30. Sensors 66 may also include a motion sensor such as accelerometer 28 or other sensor that can sense the motion and position of stylus 10. Touch sensor 50 may be used to gather touch input from a user's finger or other external objects. Touch sensor 50 may be a capacitive touch sensor having an array of capacitive touch sensor electrodes 52 or may be a touch sensor based on other touch technologies (e.g., resistive touch, force-based touch, light-based touch, acoustic touch, etc.). If desired, touch sensor 50 may incorporate force sensing (pressure sensing structures). For example, piezoelectric force sensor structures may be included in touch sensor 50 or in the vicinity of touch sensor 50, strain-gauge force sensor structures such as force sensors based on resistive strain gauges may be incorporated into touch sensor 50 or stylus 10 in the vicinity of touch sensor 50, electrodes in touch sensor 50 may be configured to flex inward under pressure (e.g., so that capacitance changes can be measured that are reflective of how much force is being applied to touch sensor 50), or other force sensor structures may be incorporated into stylus 10 (e.g., as part of touch sensor 50, in a portion of stylus 10 that is overlapped by touch sensor 50, or elsewhere in stylus 10).

Sensors 66 may also include additional sensors such as a temperature sensor, an ambient light sensor, a light-based proximity sensor, a magnetic sensor, pressure sensor, and/or other sensors. Input-output devices 64 may, if desired, include microphones, speakers, tone generators, vibrators, cameras, data ports, and other equipment. A user can control the operation of stylus 10 and the external equipment with which stylus 10 interacts by supplying commands through input-output devices 64 and may receive status information and other output from stylus 10 using the output resources of input-output devices 64.

Control circuitry 60 may be used to run software on stylus 10 that controls the operation of stylus 10. During operation of stylus 10, the software running on control circuitry 60 may process sensor input, button input, and input from other devices 64 to monitor touch sensor input from touch sensor 50, and other user input. The software running on control circuitry 60 may detect user commands and may communicate with external equipment.

To support wireless communications with external equipment 40 using wireless signals 44, stylus 10 may include active stylus electrodes 20 and wireless circuitry 71. Wireless circuitry 71 may include a radio-frequency transceiver such as transceiver 75. Wireless circuitry 71 may also include one or more antennas such as antenna 73. Transceiver 75 may transmit and/or receive wireless signals using antenna 73. The wireless signals may be Bluetooth® signals, IEEE 802.11 wireless local area network signals, long range signals such as cellular telephone signals, near-field communications signals, or other wireless signals.

External equipment 40 may include one or more electronic devices having components such as touch sensor 84 and display 54. Touch sensor 84 may be a capacitive touch sensor, a resistive touch sensor, an acoustic touch sensor, a force-based touch sensor, an optical touch sensor, a touch sensor that uses other touch technologies, or a touch sensor that uses two or more of these types of touch sensor structures. Display 54 may be a liquid crystal display, an organic light-emitting diode display, an electrophoretic display, an electrowetting display, or any other suitable type of display. Display 54 may be a touch screen display (e.g., a display that incorporates touch sensor 84) or may be insensitive to touch.

In some configurations, touch sensor 84 and display 54 may be implemented in separate devices. For example, touch sensor 84 may form part of a drawing tablet without a display and display 54 may form part of a computer monitor or other equipment without a touch sensor. Configurations in which equipment 40 includes other combinations of touch sensors and displays may also be used. For example, stylus 10 may be used to provide input to a tablet computer, cellular telephone, or computer through a touch screen display while also providing wireless input to control a computer or other device with a display with an optional touch sensor or while providing input to the tablet computer, cellular telephone, or computer with the touch screen display.

Stylus 10 may be provided with sufficient capabilities to gather multiple different types of input. For example, tip 18 of stylus 10 may be used to provide input to a touch sensor for drawing lines on display 54 and otherwise controlling equipment 40, whereas touch sensor 50 may be used to gather touch input from a user's fingers (e.g., to receive touch gestures or other touch input). A user of a drawing program may use tip 18 of stylus 10 to draw lines that form on-screen objects. When it is desired to rotate or tilt the object, the user can use touch sensor 50 in stylus 10 to perform appropriate on-screen object rotation and/or tilt operations. Touch sensor 50 may also be used to scroll a displayed screen of content on equipment 40, etc.

Figure 4:
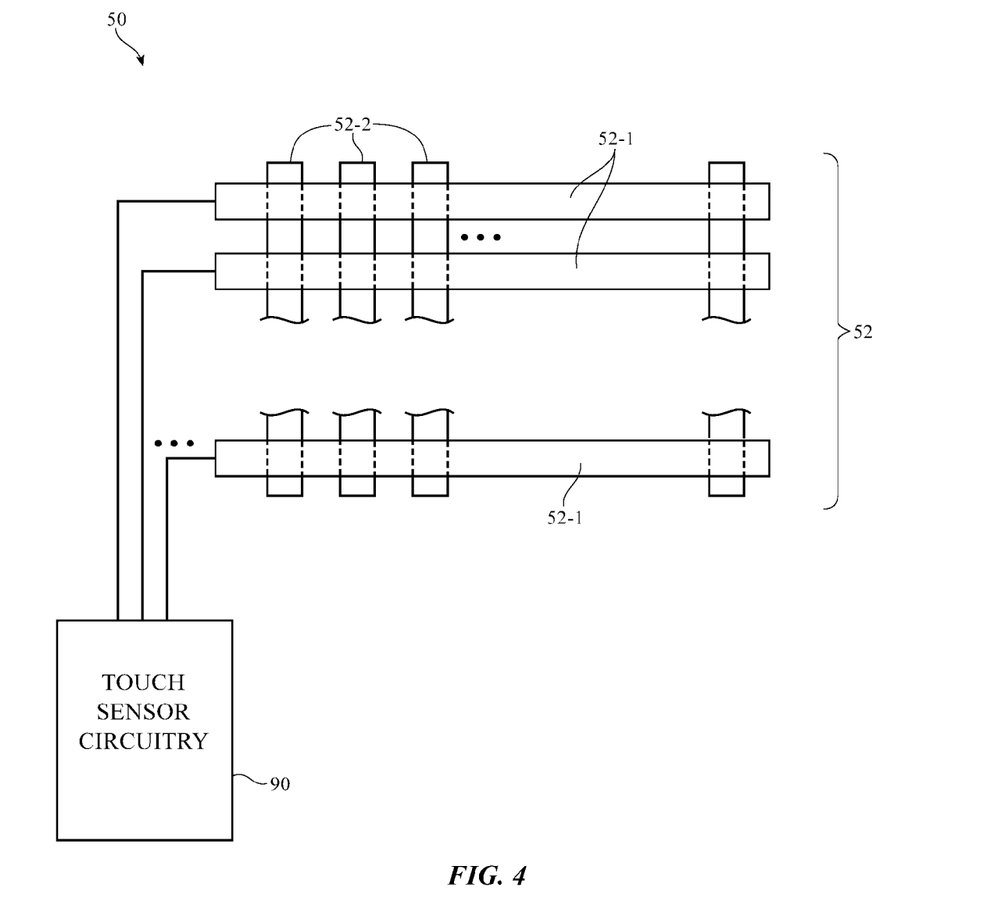
FIG. 4 is a diagram of a touch sensor in accordance with an embodiment.
Figure 5:
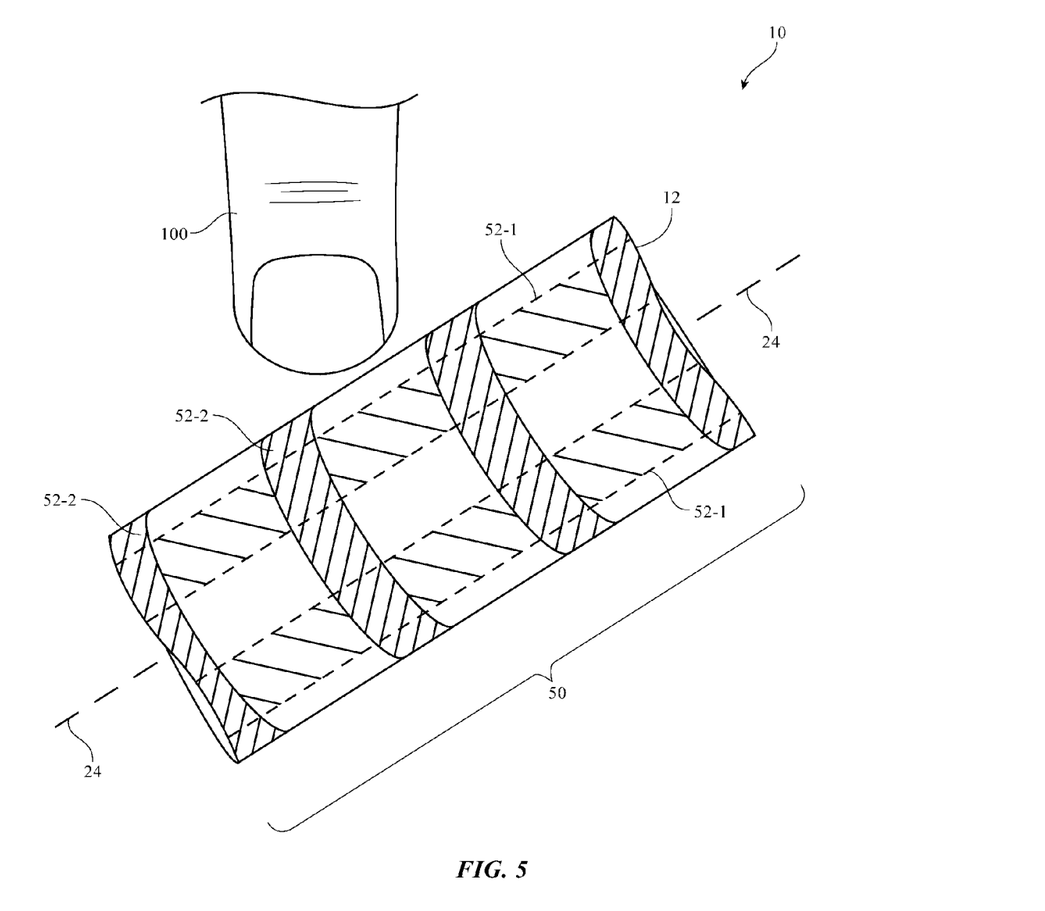
FIG. 5 is a diagram of a portion of an illustrative stylus body that has been provided with a touch sensor that extends along the length of the stylus and that wraps around the circumference of the stylus in accordance with an embodiment.

FIG. 4 is a top view of an illustrative array of touch sensor electrodes 52. As shown in FIG. 5, touch sensor 50 may include touch sensor circuitry 90. Touch sensor circuitry 90 may operate touch sensor 50 in a self-capacitance configuration or a mutual capacitance configuration. For example, touch sensor 50 may be a mutual capacitance touch sensor in which drive signals are applied to a first set of electrodes and in which corresponding sense signals are monitored on a second set of electrodes. The first and second sets of electrodes may have elongated strip shapes that extend perpendicular to each other (as shown by illustrative electrodes 52-1 and 52-2) or may have other patterns (crosses, diamonds, arrays of squares, interspersed lines and rectangles, etc.). In some configurations electrodes 52 are formed on upper and lower layers of a dielectric substrate. In other configurations, electrodes 52 are formed on a single surface of a substrate.

A touch sensor array formed from electrodes 52 of FIG. 4 may be implemented on a flexible substrate that is wrapped around the surface of body 12, as shown in FIG. 5. Electrodes 52-1 (e.g., metal electrodes) may run along the length of body 12. Electrodes 52-2 may be rings of metal or other conductive material that extend around the circumference of body 12. Arrangements of the type shown in FIG. 5 allow touch sensor 50 to sense the position of a user's finger(s) 100 both along axis 24 and around the circumference of body 12.

Figure 6:
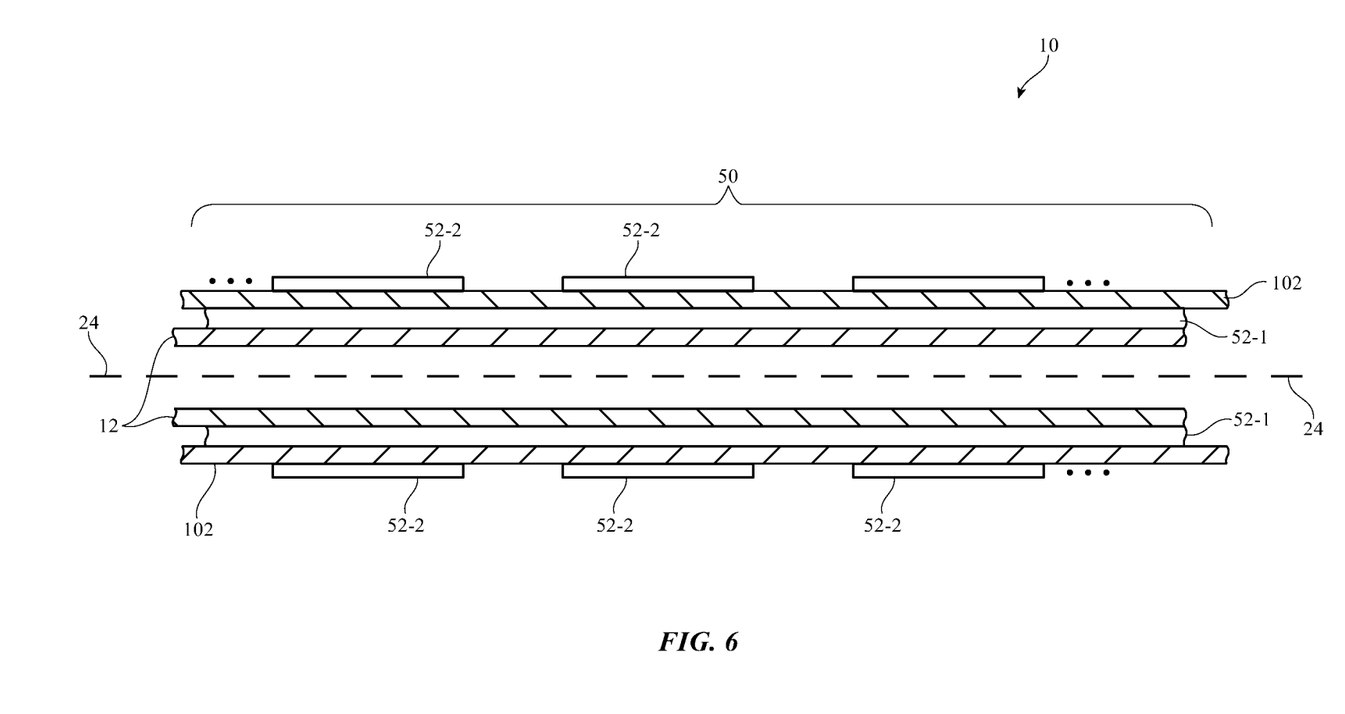
FIG. 6 is a cross-sectional side view of an illustrative stylus touch sensor of the type shown in FIG. 5 in accordance with an embodiment.

FIG. 6 is a cross-sectional side view of a portion of stylus 10 in the vicinity of sensor 50. In the illustrative configuration of FIG. 6, sensor 50 has overlapping electrodes 52-1 and 52-2. Electrodes 52-1 run parallel to axis 24. Electrodes 52-2 extend around the circumference of stylus 10 perpendicular to electrodes 52-1. Dielectric layer 102 (e.g., plastic, etc.) may be used to separate electrodes 52-1 and 52-2. Body 12 may be formed from plastic or other materials that serve as a support structure for touch sensor 50.

Figure 7:
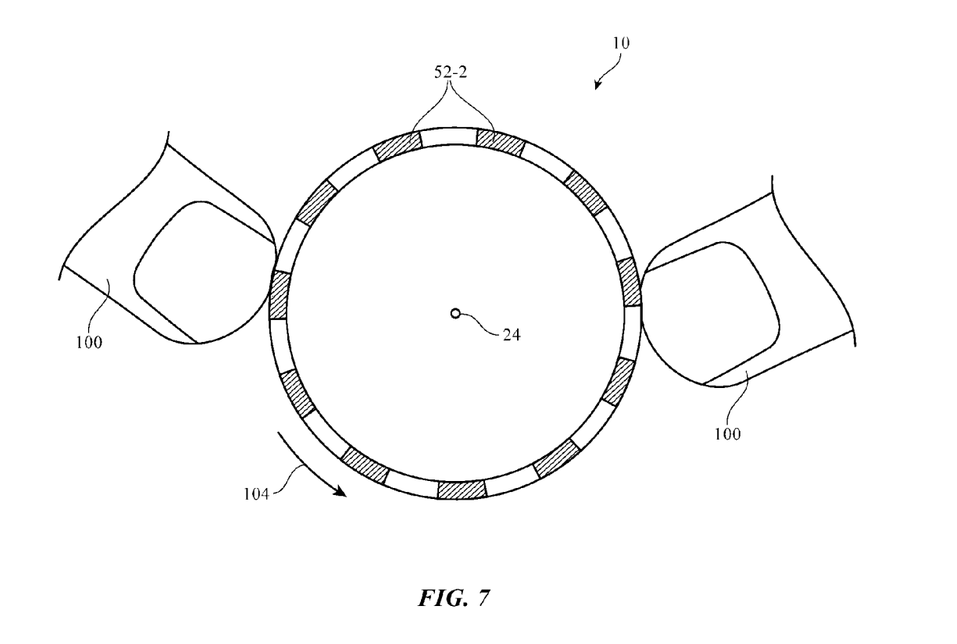
FIG. 7 is cross-sectional end view of an illustrative stylus with a touch sensor in accordance with an embodiment.

FIG. 7 is a cross-sectional end view of stylus 10 taken through sensor 50 showing how electrodes 52-2 may be used to measure the position of finger(s) 100 around the circumference of stylus 10, (circumferential distance 104). The positions of two fingers may be simultaneously gathered and used to determine how a user is rotating stylus 10 about axis 24. As described in connection with FIG. 2, measurement of the rotation of stylus 10 about axis 24 with sensor 50 allows stylus 10 to control the rotation of on-screen objects and to otherwise control equipment 40.

Figure 8:
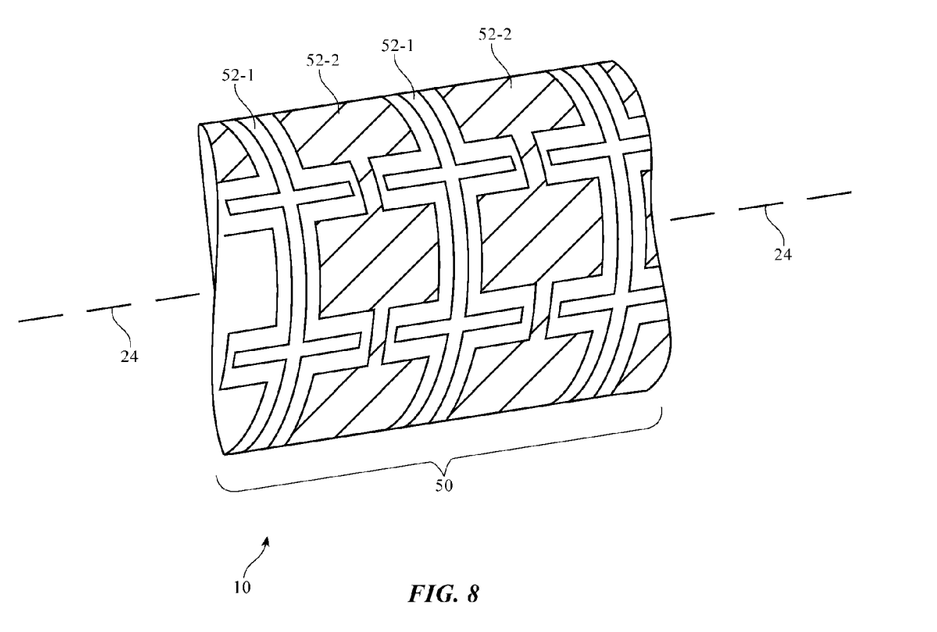
FIG. 8 is a perspective view of a portion of an illustrative stylus having a touch sensor with an electrode pattern that provides longitudinal touch position information in accordance with an embodiment.

Another illustrative pattern for touch sensor electrodes 52 of touch sensor 50 of stylus 10 is shown in the perspective view of FIG. 8. In the example of FIG. 8, touch sensor electrodes 52-1 and 52-2 both run around the entire circumference of stylus 10, so no rotational position information is being gathered. Rather, electrodes 52-1 and 52-2 of FIG. 8 are used to gather longitudinal position information (i.e., information on the location of the user's fingers along axis 24).

Figure 9:
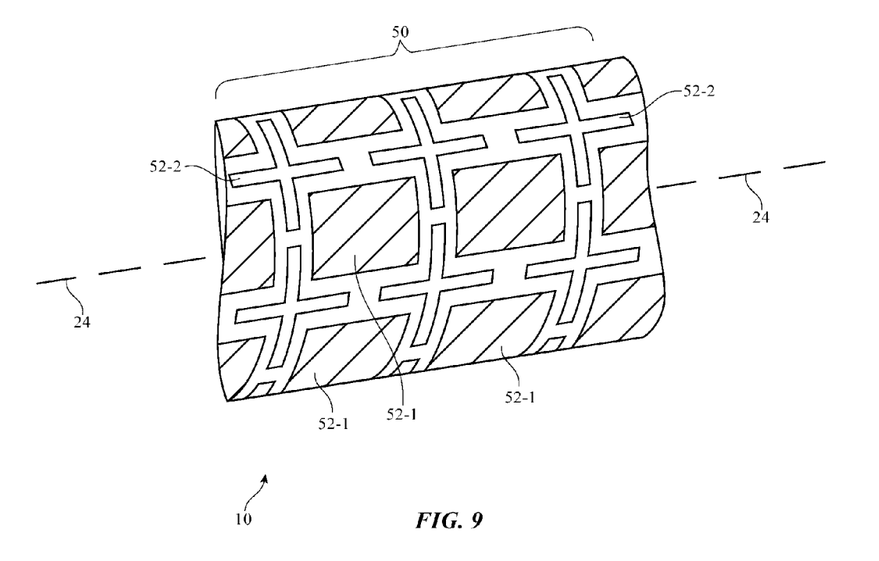
FIG. 9 is a perspective view of a portion of an illustrative stylus having a touch sensor with an electrode pattern that provides longitudinal touch position information and information on the position of touch input around the circumference of the stylus in accordance with an embodiment.

In the example of FIG. 9, touch sensor 50 has an array of electrodes 52 that include cross-shaped electrodes 52-2 and square electrodes 52-1. Electrodes 52-1 and 52-2 of FIG. 9 are interspersed with each other in an array. This type of pattern allows both longitudinal position information and circumferential position information to be gathered. Other types of pattern may be used if desired. If desired, the spacing of the touch sensor electrodes may vary as a function of length along axis 24 (e.g., to increase touch sensor accuracy in certain locations of sensor 50), etc. The examples of FIGS. 5, 6, 7, 8, and 9 are merely illustrative.

It may be desirable to operate stylus 10 and equipment 40 in multiple operating modes. For example, it may be desirable to suppress touch input touch sensor 50 when tip 18 is being used to draw lines on equipment 40. In other situations, it may be desirable to disable touch sensor input from tip 18 to touch sensor 84 in equipment 40 while touch gestures are being supplied to touch sensor 50 or when touch sensor 50 is being used to gather rotational commands or longitudinal touch data.

Any suitable mode switching criteria may be used to determine whether to transition between operating modes. For example, stylus 10 and equipment 40 may be directed to transition between modes when the user presses tip 18 against equipment 40. Stylus 10 may also transition out of drawing mode whenever tip 18 is lifted from touch sensor 84. Modes may also be switched based on other criteria such as button presses from button 36, presses of eraser end 16 of stylus 10 against a surface to actuate force sensor 30, detected shakes of stylus 10 (to provide input to accelerometer 28), etc. Mode switching may also be performed when environmental criteria are satisfied (e.g., when a predetermined time and date are reached, when ambient light levels, temperature levels, pressure levels, or other environmental parameters fall within predetermined limits, or when other mode switching criteria are satisfied). Combinations of user input and environmental factors may also be used.

Figure 10:
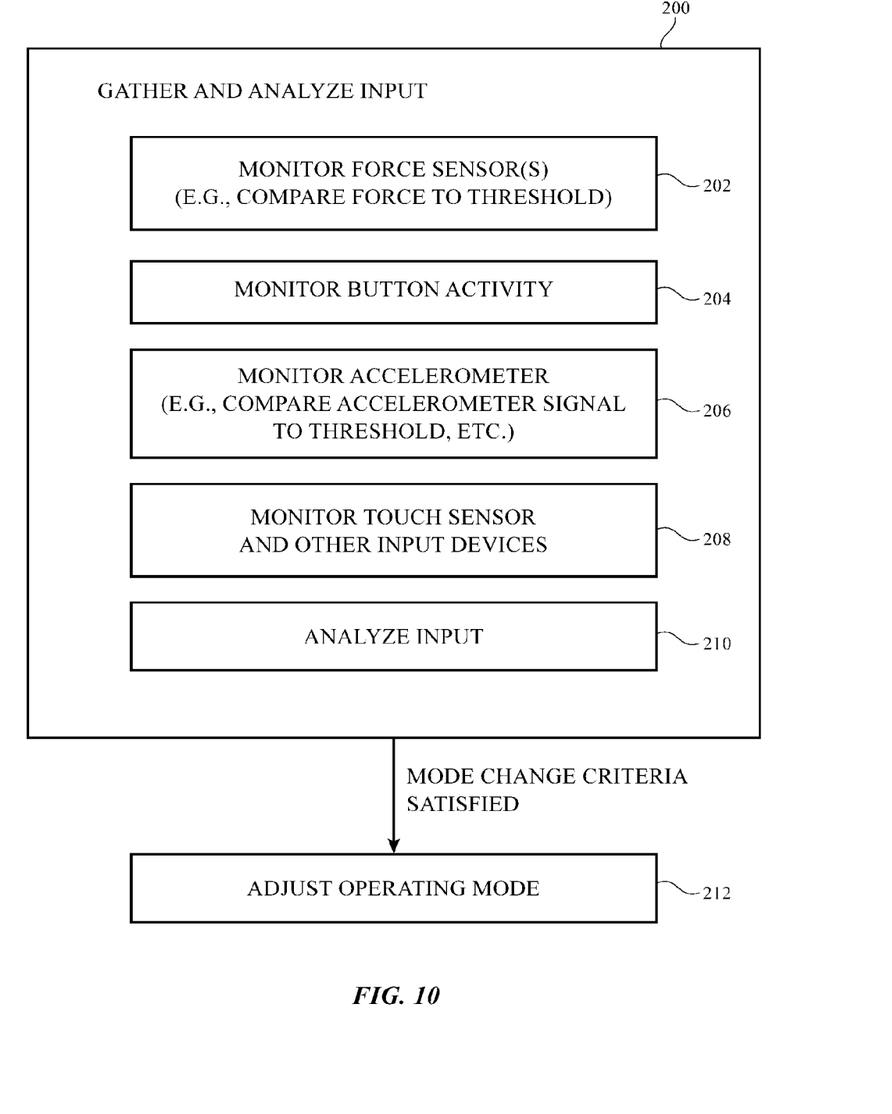
FIG. 10 is a flow chart of illustrative steps involved in gathering and analyzing stylus input to determine whether to transition between operating modes for the stylus and electronic equipment in accordance with an embodiment.

Illustrative steps involved in gathering user input and in analyzing the gathered input to determine whether or not to switch operating modes for stylus 10 are shown in FIG. 10.

At step 200, control circuitry 60 of stylus 10 is used to gather input to stylus 10 and to analyze the gathered input to determine whether or not to change the operating mode of stylus 10.

During the operations of step 202, stylus 10 may monitor force sensors such as sensors 22 and 30. In some situations, a user will be holding stylus 10 between the user's fingers. In this type of situation, it may be convenient for the user to press tip 18 or end 16 of stylus 10 against equipment 80 or other object. When pressed in this way, the force sensor signal may exceed a predetermined amount, indicating that a mode change is desired. A single press on tip 18 (or end 16) may be used to invoke a mode change or other patterns of tip presses may be used (e.g. one pattern of presses may be used to invoke a first mode of operation and another pattern of presses may be used to invoke a distinct second mode of operation).

At step 204, stylus 10 may monitor button activity. For example stylus 10 may use control circuitry 60 to determine whether button 36 of FIG. 1 has been pressed and/or has been pressed in a particular pattern.

At step 206, stylus 10 may monitor sensor 28 to determine whether stylus 10 has been moved by more than a particular amount or in a particular pattern. As an example, stylus 10 may use sensor 28 to determine whether a user has shaken stylus 10 by more than a predetermined amount and/or may use sensor 28 to monitor for a predetermined pattern of shakes (e.g., three rapid shakes in succession, a circular motion, a flick of end 16 in the air, or other movement pattern that is indicative of a mode change command).

At step 208, stylus 10 may use circuitry 60 to monitor for input from touch sensor 50 and other input-output devices 64.

At step 210, information gathered from input-output devices 64 may be analyzed to determine whether the user of stylus 10 is directing stylus 10 to change its operating mode. Control circuitry 60 may be configured to recognize patterns in the inputs gathered during steps such as steps 202, 204, 206, and 208. For example, a pattern of force sensor signals arising from a particular pattern of presses against stylus tip 18 (or end 16) may be associated with a predetermined operating mode, a pattern of movements of end 16 (e.g. by waving stylus 10 in the air in with a particular motion) may be associated with a predetermined operating mode, button presses of particular patterns and information from other input-output devices, touch sensor inputs to touch sensor 50 such as particular touch gestures may be associated with a predetermined operating mode, or patterns of two or more of these inputs may be associated with a command to enter a particular operating mode.

At step 212, control circuitry 60 may change the operating mode of stylus 10 and/or equipment 40 based on the inputs analyzed during the operations of step 210. Mode change commands may be mode specific. For example, a user may enter a touch sensor mode in which touch sensor 50 is in active use by pressing down on tip 18 once, may enter a drawing mode in which tip 18 is active and sensor 50 is disabled by pressing down on tip 18 twice, etc. Mode change commands may also be generic. For example, whenever a double press on tip 18 is detected, stylus 10 may switch to another operating mode.

Figure 11:
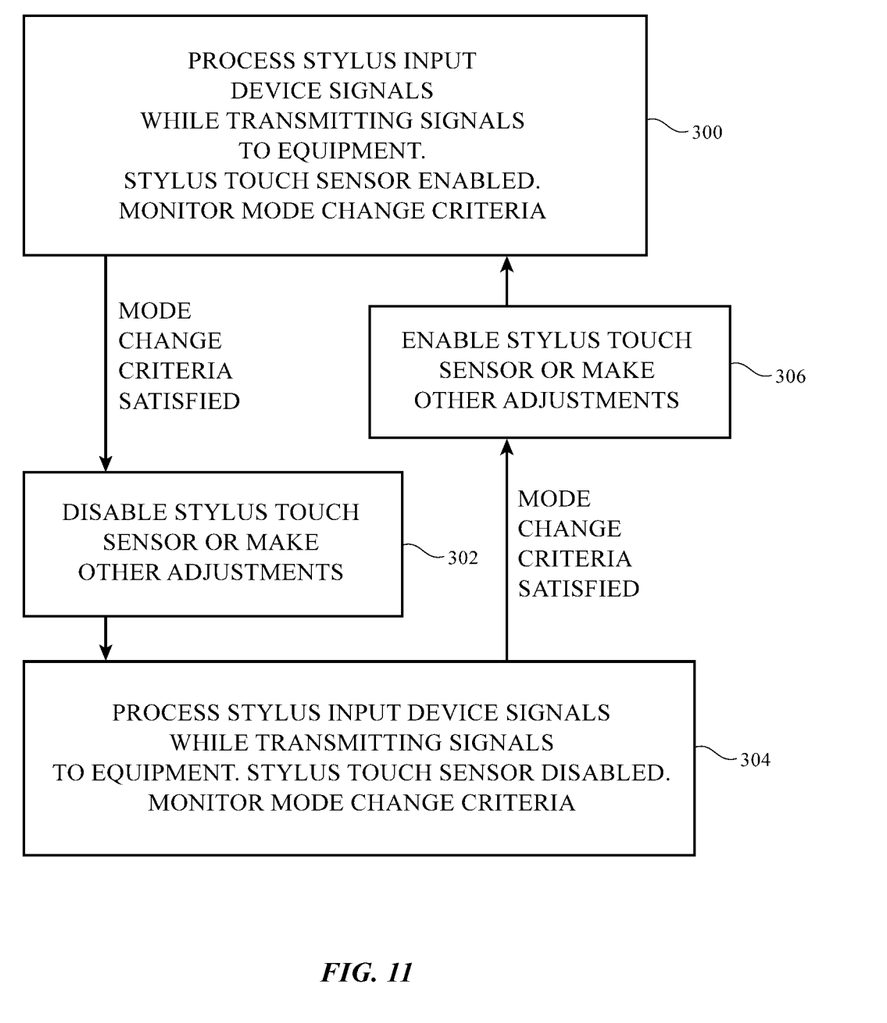
FIG. 11 is a flow chart of illustrative steps involved in using stylus input to operate electronic equipment in accordance with an embodiment.

FIG. 11 is a flow chart of illustrative steps involved in operating stylus 10 and equipment 40.

At step 300, stylus 10 and equipment 40 may be operated in a first mode. Input device signals in stylus 10 such as accelerometer signals, touch sensor signals, button press signals, force sensor signals, and other signals from input-output devices 64 may be monitored and these signals may be wirelessly transmitted to equipment 40 to serve as an input to control equipment 40. During the first operating mode, touch sensor 50 may be enabled and may gather touch input from a user's fingers. If desired, some functions may be suppressed. For example, touch input by touch sensor 84 and/or signal emission by electrodes 20 may be suppressed to avoid inadvertent input to equipment 40 with tip 18 while touch commands are being supplied to touch sensor 50. During the first mode of operation, input-output devices 64 may be monitored to determine whether or not predetermined mode switching criteria have been satisfied, as described in connection with FIG. 10.

In response to a determination by control circuitry 60 that the operating mode should be switched, touch sensor 50 may be disabled, electrodes 20 may be activated, and other adjustments to the operating settings of stylus 10 and/or equipment 40 may be made (step 302).

Following the operations of step 302, stylus 10 and equipment 40 may be operated in a second operating mode (step 304). Input-output devices 64 may gather signals that are wirelessly transmitted to equipment 40 to serve as input for controlling equipment 40. During the operations of step 304, touch sensor 50 may be disabled but other resources such as electrodes 20 may be enabled. Electrodes 20 may emit signals that are detected by touch sensor 84 in equipment 40, which allows a user to draw lines on display 54 and perform other actions using tip 18. Mode switching criteria may be monitored using the operations of FIG. 10.

In response to a determination by control circuitry 60 that the operating mode should be switched away from the second mode, touch sensor 50 may be enabled, electrodes 20 may be disabled, and/or other operating settings for stylus 10 and/or equipment 40 may be adjusted (step 306). Operation may then return to the first mode (step 300).

If desired, stylus 10 and/or equipment 40 may operate in three or more different operating modes. The example of FIG. 11 in which stylus 10 toggles between a first state in which touch sensor 50 is active and a second state in which touch sensor 50 is inactive is merely illustrative.

The foregoing is merely illustrative and various modifications can be made by those skilled in the art without departing from the scope and spirit of the described embodiments. The foregoing embodiments may be implemented individually or in any combination.

What is claimed is:

1. A stylus that controls electronic equipment that includes a touch sensor and a display, comprising:
   a body with first and second opposing ends and a tip at the first end that supplies input to the touch sensor in the electronic equipment;
   a touch sensor that extends along at least some of the body, wherein the body extends along a longitudinal axis and has a circumference, wherein the touch sensor on the body measures finger touch positions around the circumference, wherein the touch sensor includes a first set of electrodes that run parallel to the longitudinal axis and a second set of electrodes that extend around the circumference perpendicular to the first set of electrodes, wherein the first and second sets of electrodes are coupled to touch sensor circuitry in the body, wherein the second set of electrodes gather touch gestures involving finger movements along the longitudinal axis, wherein the first set of electrodes gather touch gestures involving finger movements along the circumference, and wherein the stylus is configured to rotate an image of an object on the display in response to the finger movements along the circumference; and
   wireless circuitry that includes a radio-frequency transceiver and an antenna, wherein the wireless circuitry wirelessly transmits touch sensor input from the touch sensor on the body to the electronic equipment.

2. The stylus defined in claim 1 further comprising control circuitry that operates the stylus in a first mode in which the touch sensor on the body is enabled and a second mode in which the touch sensor on the body is disabled.

3. The stylus defined in claim 2 wherein the second set of electrodes measure finger touch positions along the longitudinal axis.

4. The stylus defined in claim 1, wherein each electrode in the second set of electrodes extends completely around the circumference.

5. The stylus defined in claim 4, wherein each electrode in the first set of electrodes has a length and a width, wherein the length is parallel to the longitudinal axis, wherein the width is parallel to the circumference, and wherein the length is longer than the width.

6. A stylus that provides input to electronic equipment, comprising:
   an elongated body with first and second opposing ends;
   an electrode at the first end that emits electromagnetic signals that are detected by a touch sensor in the electronic equipment;
   a touch sensor that extends along at least some of the elongated body, wherein the elongated body extends along a longitudinal axis and has a circumference, wherein the touch sensor has an array of capacitive touch sensor electrodes that sense finger movements along the longitudinal axis and finger movements along the circumference, and wherein the finger movements along the circumference are indicative of how the stylus is being rotated; and
   wireless circuitry that includes a radio-frequency transceiver and an antenna, wherein the wireless circuitry wirelessly transmits touch sensor input from the touch sensor on the elongated body to the electronic equipment.

7. The stylus defined in claim 6 further comprising a force sensor that measures force signals when the first end is pressed against the touch sensor in the electronic equipment.

8. The stylus defined in claim 7 further comprising control circuitry that, in response to the force signals, switches between a first mode in which the touch sensor on the body is inactive and a second mode in which the touch sensor on the body is active.

9. The stylus defined in claim 6 wherein the touch sensor comprises at least one force sensor.

* * * * *